United States Patent [19]

Yoo et al.

[11] Patent Number: 5,461,094

[45] Date of Patent: Oct. 24, 1995

[54] BIODEGRADABLE POLYETHYLENE COMPOSITION CHEMICALLY BONDED WITH STARCH AND A PROCESS FOR PREPARING THEREOF

[75] Inventors: Yong-deuk Yoo, Seoul; Yong-wook Kim, Bucheon; Won-yung Cho, Incheon, all of Rep. of Korea

[73] Assignee: Yukong Limited, Seoul, Rep. of Korea

[21] Appl. No.: 156,371

[22] Filed: Nov. 23, 1993

[30] Foreign Application Priority Data

Nov. 24, 1992 [KR] Rep. of Korea ............... 92-22256
Jul. 23, 1993 [KR] Rep. of Korea ............... 93-14073

[51] Int. Cl.$^6$ .................. C08L 3/06; C08L 3/08; C08L 3/00; C08K 5/09
[52] U.S. Cl. .................. 524/47; 524/50; 524/51; 524/52; 524/322; 524/394; 524/398; 523/126; 523/128; 525/54.26
[58] Field of Search ............... 524/47, 522, 50, 524/51, 517, 394, 322; 523/124, 128, 126; 526/238.22; 525/54.26

[56] References Cited

U.S. PATENT DOCUMENTS 3,867,324  2/1975  Clendinning et al. ............... 523/126
5,234,977  8/1993  Bastioli et al. ............... 524/47

FOREIGN PATENT DOCUMENTS 232311  1/1959  Australia ............... 525/54.26

*Primary Examiner*—Paul R. Michl
*Assistant Examiner*—LaVonda R. DeWitt
*Attorney, Agent, or Firm*—Abelman, Frayne & Schwab

[57] ABSTRACT

The present invention relates to a biodegradable film prepared by chemical bonding of starch and polyethylene chains using polyethylene, which is polyolefin having the most widest general application, coupling agent such as maleic anhydride, methacrylic anhydride or maleimide which bonds with starch and polyethylene, and acid catalytic comonomer like acrylic acid and/or methacrylic acid and to a process for preparing thereof.

The present invention was accomplished varying coupling agent such as maleic anhydride, methacrylic anhydride or maleimide at an amount of 0.01–10 weight %, acid catalytic comonomer such as acrylic acid and/or methacrylic acid at an amount of 0.01–10 weight % and radical initiator at an amount of 0.01 1.0 weight % based on the amount of polyethylene, and the reactive extrusion was appelied to lower the production cost by process simplification.

There was no difference in tensile strength and tensile elongation of the prepared biodegradable films comprising up to 20 wt. % of starch in comparison with the base resin by Instron measurement. The facts that ester bond showing chemical bonding between starch and matrix resin was found on the infrared absorption spectrum and the phenomenons that the boundary between matrix resin and starch particle is unclear, and the starch particle is cross-sectionally cut are shown on the cross-section of films with scanning electron microscope approving chemical bonding between starch and matrix. The biodegradability was the most excellent with more than 10 wt. % of starch.

15 Claims, 2 Drawing Sheets

BIODEGRADABLE POLYETHYLENE COMPOSITION CHEMICALLY BONDED WITH STARCH AND A PROCESS FOR PREPARING THEREOF

Cross Reference to Related Applications

Application Ser. No. 08/156,369 is a related application.

1. Field of the Invention

This invention relates to a biodegradable polyethylene composition by chemically bonding starch to polyethylene chains using a coupling agent such as maleic anhydride, methacrylic anhydride or maleimide, which couples with starch and polyethylene which is a polyolefin having the widest application, and a acid catalyst such as acrylic acid and/or methacrylic acid, which is a compatibilizer and catalyst, and to a process for preparing thereof.

2. Description of the Prior Art

Synthetic plastic overcame the problems and limit of natural material for its excellent physical properties, lightness and low price. Plastic civilization which is one of the modern scientific characteristics has established by developing various polymers, especially, plastic. However, each country of the world is preparing for diversified countermeasures as polution problems from numerous plastic products are globally getting serious and it becomes to be an interesting matter to solve such polution problems from plastic wastes.

Recycling, incineration and landfill have been mainly used to solve these environmental polution problems caused by various solid wastes, including plastic. However, disposal of wastes through landfill as well as recycling cannot solve the environmental polution problems completely.

Accordingly, great interest and studies on development of degradable plastic which can degrade itself are tending to increase recently. The technology on degradable plastic is divided into photodegradable field, biodegradable field and biophotodegradable field, a combination of photo- and biodegradable technologies.

While there are many kinds of biodegradable plastic, for example microorganism producing polymers like PHB-(poly-β-hydroxybutylate), polymers using microorganism producing biochemical, or polymers having natural polymer like chitin or starch, the problems which are concerned with the present technology about polymers having starch will be mentioned and improvements will be described in this specification.

U.S. Pat. No. 4,021,388 by G. J. L. Griffin discloses a process for preparing biodegradable film improved by treating the surface of starch with silane coupling agent to be hydrophobic, but it only increases physical interacting strength a little between matrix resin and starch so that it has difficulty to solve the decrease of physical properties of films on incorporating starch.

While U.S. Pat. Nos. 4,133,784 and 4,337,181 filed by F. H. Otey et. al. of USDA disclose processes for preparing biodegradable films by adding α-starch to ethylene-acrylic copolymer, it has difficulty to generalize for the high price of ethylene-acrylic copolymer and lowering of physical properties of the produced films.

Korean Patent Publication Nos.90-6336 and 91-8553 filed by Seonil Glucose Co., Korea disclose processes for increasing physical interacting strength between matrix resin and starch by increasing hydrophobic property of starch or increasing hydrophilic property of matrix resin to increase compatibility with matrix resin and starch.

In the present invention, production cost is diminished by simplifying the process, as well as overcoming of towering in physical properties, getting out of the studies to overcome the lowering of physical properties of films according to starch incorporating by increasing only physical interacting strength between matrix resin and starch.

An object of this invention is to provide a biodegradable polyethylene composition chemically bonded with starch and another object of this invention is to provide a process for preparing the biodegradable polyethylene composition.

SUMMARY OF THE INVENTION

The composition of the present invention comprises 100 parts by weight of matrix resin, 5–400 parts by weight of biodegradable incorporating material, 0.01–10 parts by weight of coupling agent., 0.01–10 parts by weight acid catalytic comonomer, 0.01–1.0 parts by weight of radical initiator. 0.01–10 parts by weight of autoxidizing agent and 0.01–10 parts by weight of plasticizer and optionally 0.01–10 parts by weight of comonomer.

DESCRIPTION OF PREFERRED EMBODIMENTS

Figure 1:
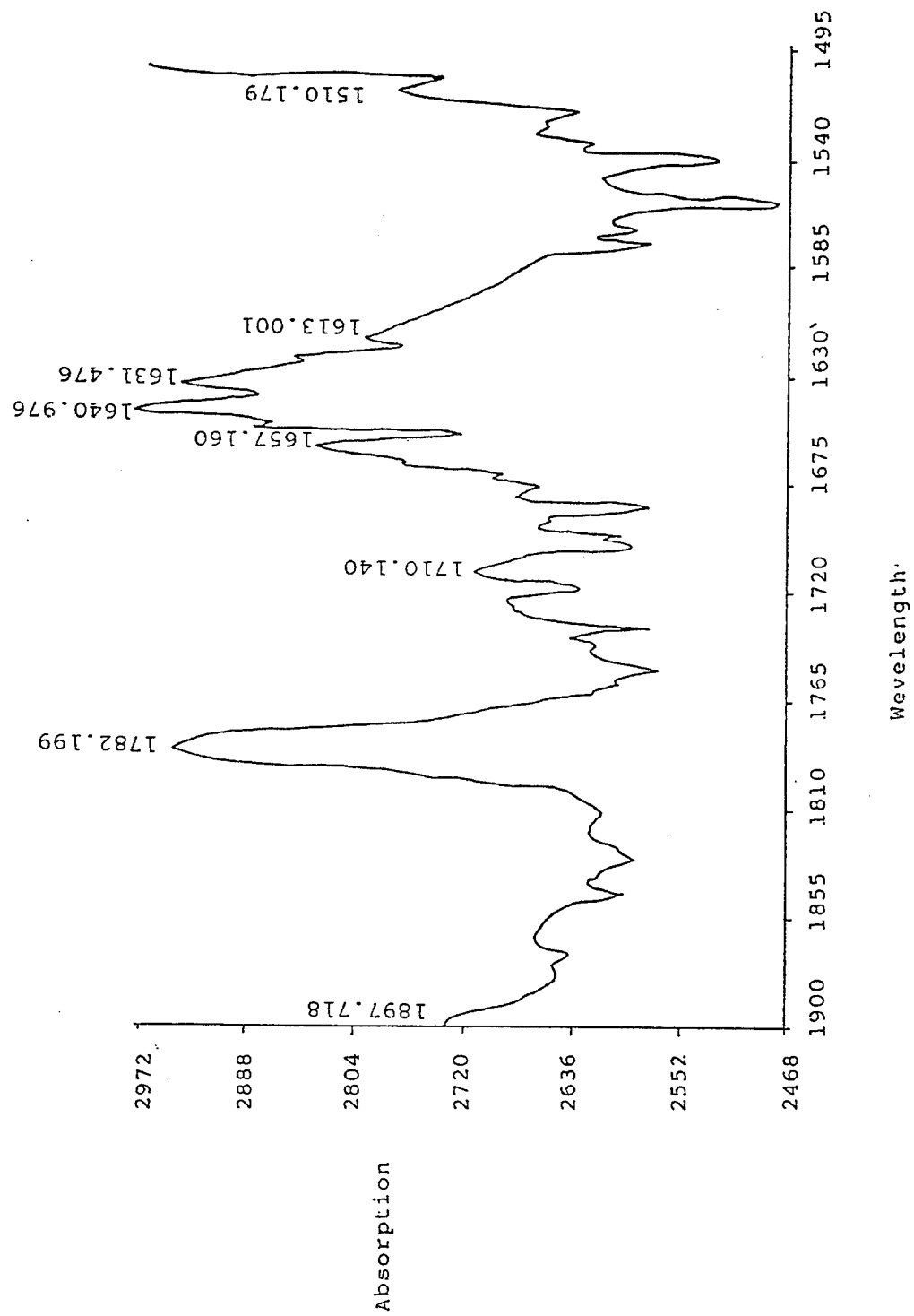
FIG. 1 is infrared ray absorption spectrum of a biodegradable film in accordance with example 1 of the present invention.

The matrix resin is low density polyethylene(LDPE), linear low density polyethylene (LLDPE)or high density polyethylene(HDPE) and the biodegradable incorporating material is one selected from the group of starch, acid treated starch, esterified starch, etherified starch, cationic starch and mixture thereof, for example corn starch, starch acetate and starch phosphate. The coupling agent which bonds chemically the starch and the matrix resin is maleic anhydride, methacrylic anhydride or maleimide, and the acid catalytic comonomer which acts as a catalyst and compatibilizer at the same time is acrylic acid and/or methacrylic acid. The radical initiator is benzoyl peroxide, di-tert-butyl peroxide, azobisisobutyronitrile, tert-butyl hydroperoxide, dicumyl peroxide, Lupersol 101 2,5-dimethyl-2,5-di(t-butyl peroxy-)hexane (Pennwalt Co.) or Perkadox-14 1,3-bis-(t-butyl peroxyisopropyl benzene) (Akzo Co.). The autoxidizing agent is one or more selected from the group of manganese oleate, manganese stearate, ferrous oleate(II), ferrous stearate(II) and mixture thereof, and the plasticizer is, for example oleamide, Viton poly(hexafluoropropylene)-copoly(vinylidene fluoride) or Erucamide cis-13-docosenoamide. The comonomer is one or more selected from the group of acrylonitrile, styrene and ethyl acrylate.

The process for preparing a biodegradable polyethylene composition chemically bonded with starch to achieve another object of the present invention comprises mixing matrix resin, biodegradable incorporating material, coupling agent, acid catalytic comonomer, autoxidizing agent, plasticizer, and radical initiator in a certain amount and reactive-extruding the mixture.

The reactive-extruding method using a twin screw extruder was applied to lower the production cost through simplifying the process and minimizing lowering of physical properties after mixing the starch. That is, polyethylene, radical initiator, coupling agent, for example maleic anhydride, methacrylic anhydride or maleimide, corn starch or starch derivatives and acid catalytic comonomer are placed at the same time and reactive-extruded at a temperature of 150°–220° C. with a screw speed of 50–300 rpm to esterify the starch at the same time of grafting the coupling agent to polyethylene chains.

It is preferable to use coupling agent like maleic anhydride, methacrylic acid or maleimide at an amount of 0.01–10 weight %, acid catalytic comonomer such as acrylic acid or methacrylic acid at an amount of 0.01–10 weight %, radical initiator at an amount of 0.01–1.0 weight %, and biodegradable incorporating material at an amount of 5–80 weight %.

The biodegradable incorporating material is, for example corn starch or modified starch and the starch is dried in advance at a moisture content in the range of less than 3%.

The biodegradable film can be prepared by mixing matrix resin(polyethylene), biodegradable incorporating material(starch or starch derivatives), coupling agent(maleic anhydride, methacrylic anhydride or maleimide), radical initiator, acid catalytic comonomer(acrylic acid or methacrylic acid), autoxidizing agent(oleic acid, metal oleate, etc), plasticizer(oleamide) in a certain amount, melting the mixture in a mixer of a plasticorder or placing each component using a compounder, melting the mixture, extruding the mixture, pelletizing it using a pelletizer and making the pellet into compression molding films or blown films using a hot press and a film extruding machine. The compression molding films or blown films can be also prepared by adding low density polyethylene, linear low density polyethylene or high density polyethylene into the pellet, dry-blending and then extruding the pellet. The biodegradable resin pellets also can be molded into polyethylene bottles.

Figure 2:
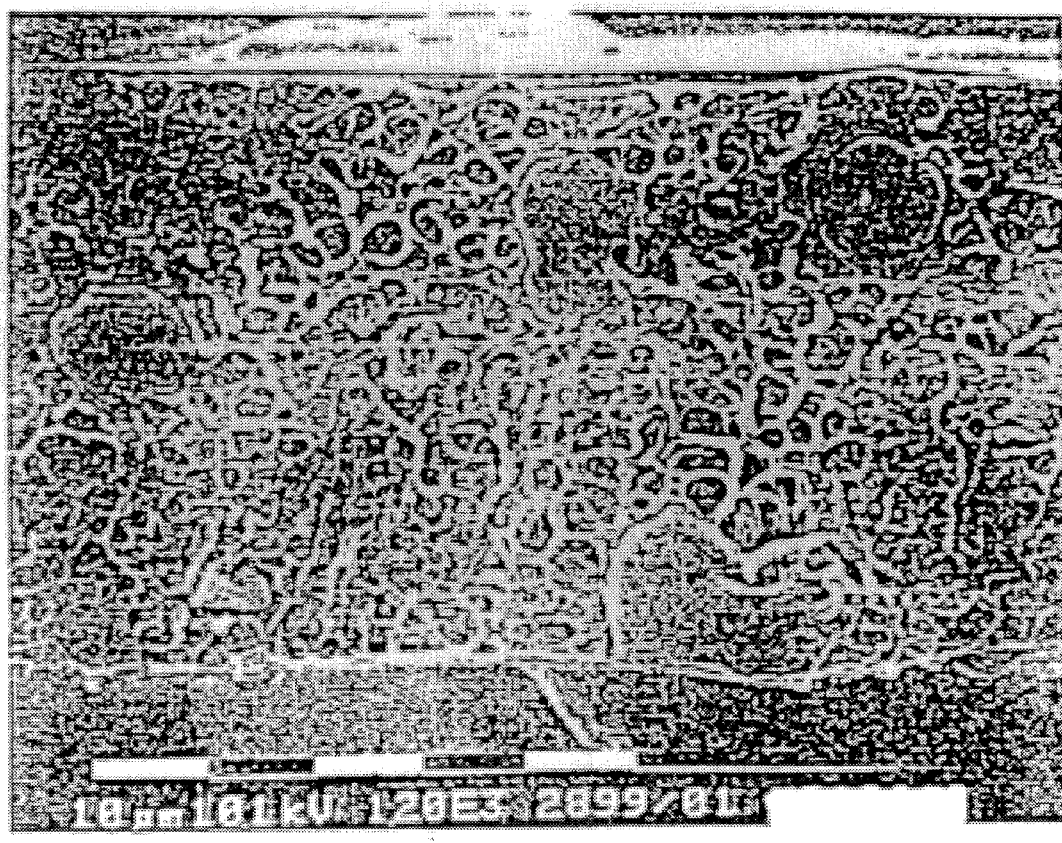
FIG. 2 is a electron micrograph showing a section of a biodegradable film in accordance with example 1 of the present invention by scanning electron microscope(×1,200).

The mechanical properties such as tensile strength and tensile elongation of the biodegradable films prepared in accordance with the following examples 1–13 were determined by UTM(Universal Testing Machine) and the physical properties determined through standard instruments of ASTM. The surface and cross section were also investigated by scanning electron microscope. The absorbing peak of ester carboxyl group is shown at 1700–1800 $cm^{-1}$ on infrared absorption spectrum (Refer to FIG. 1) and the facts that boundary between matrix resin and starch particle is unclear and the phenomenon that the starch particle is cross-sectionally cut are shown on the cross-section of films with scanning electron microscope (Refer to FIG. 2), which means that starch is bonded with polyethylene chains chemically.

The biodegradability was investigated by shape deformation and by time dependent changes in physical properties after the films were buried under soil as well as by using ASTM G 21-70 method.

The following examples illustrate the present invention further but do not limit the scope of the present invention.

Example 1

The biogradable films were prepared in this example by chemical bonding between starch and polyethylene chains with maleic anhydride as a coupling agent, acrylic acid as a acid catalytic comonomer, and styrene as a comonomer for improving reaction efficiency of coupling agent.

37.5 g of maleic anhydride, 12.5 g of acrylic acid, 37.5 g of styrene, 5 g of benzoyl peroxide, 50 g of oleamide, and 50 g of manganese oleate were dissolved in 50 ml of acetone, respectively. 5 kg of low density polyethylene(MI= 3, density=0.919) was put into Henschel mixer and then coated with the above solution.

The coated polyethylene pellet was reactive-extruded with 60 weight % of corn starch based on the above low density polyethylene in an extruder maintained at 170° C. with a srew speed of 250 rpm to prepare biodegradable master batch pellet in which the starch is chemically bonded with the polyethylene chains.

1.7 kg of the biodegradable master batch and 8.3 kg of low density polyethylene(MI=3, density=0.919) were dry-blended to prepare blown films by passing them through a film extruding machine.

The physical properties and biodegradability of the biodegradable films prepared by dry-blending the above biodegradable master batch and low density polyethylene(MI= 3, density=0.919) were reported in the following table 1.

The biodegradability was determined in accordance with ASTM G 21-70 method. After a definited time(at least for 21 days), growth rates were classified according to the fraction of the polymer surface covered with fungal colonies:

0%:0 less than 10%:1

10–30%:2

30–60%:3

60–100%:4

EXAMPLES 2–6

The same procedure as example 1 was repeated except that the following wt. % of starch was used based on polyethylene and the results determined by the same method as example 1 were reported in the following table 1.

TABLE 1

| Ex. No. | Content of Starch (wt. %) | Tensile Strength ($kg/cm^2$) | Tensile Elongation (%) | Biodegradability |
|---|---|---|---|---|
| Com. 1* | 0 | 330 | 600 | 0 |
| 1 | 10 | 315 | 560 | 3 |
| 2 | 20 | 295 | 530 | 4 |
| 3 | 30 | 215 | 450 | 4 |
| 4 | 40 | 153 | 270 | 4 |
| 5 | 50 | 124 | 140 | 4 |
| 6 | 60 | 87 | 80 | 4 |

*Comparative Example 1: It was estimated with the same procedure as example 1 except that?starch was not incorporated.

EXAMPLE 7

The biodegradable films were prepared in this example using methacrylic anhydride as a coupling agent and methacrylic acid as a acid catalytic comonomer to couple polyethylene chains with starch chemically.

50 g of methacrylic anhydride, 25 g of methacrylic acid, 5 g of benzoyl peroxide, 50 g of oleamide and 50 g of manganese oleate were dissolved in 50 ml of acetone, respectively. 5 kg of linear low density polyethylene(MI=1, density=0.919) was put into Henschel mixer and then coated with the above solution.

The coated polyethylene pellet is reactive-extruded with 60 wt. % of cationic starch based on the above linear low density polyethylene in an extruder maintained at 175° C. with a screw speed of 200 rpm to prepare biodegradable master batch pellet in which starch is chemically bonded with polyethylene.

1.7 kg of the biodegradable master batch and 8.3 kg of linear low density polyethylene(MI 0.28, density 0.945) are dry-blended to prepare biodegradable blown films by passing them through a film extruding machine.

The physical properties and biodegradability of the biodegradable films prepared by dry-blending the above biodegradable master batch and linear low density polyethylene(MI 0.28, density 0.945) were reported in the following table 2.

EXAMPLE 8–12

The same procedure as example 7 was repeated except that the following wt % of starch was used based on polyethylene and the results determined by the same method as example 7 were reported in the following table 2.

TABLE 2

| Ex. No. | Content of Starch (wt. %) | Tensile Strength (kg/cm$^2$) | Tensile Elongation (%) | Biodegradability |
|---|---|---|---|---|
| Com. 2* | 0 | 640 | 600 | 0 |
| 7 | 10 | 635 | 680 | 3 |
| 8 | 20 | 614 | 555 | 4 |
| 9 | 30 | 516 | 454 | 4 |
| 10 | 40 | 321 | 335 | 4 |
| 11 | 50 | 189 | 215 | 4 |
| 12 | 60 | 106 | 123 | 4 |

*Comparative Example 2: It was estimated with the same procedure as example 7 except that starch was not incorporated.

There was no difference in tensile strength and tensile elongation of the prepared biodegradable films comprising up to 20 wt. % of starch in comparison with the base resin by Instron measurement. The facts that ester bond showing chemical bonding between starch and matrix resin was found on the infrared absorption spectrum and the phenomenons that the boundary between matrix resin and starch particle is unclear, and the starch particle is cross-sectionally cut are shown on the cross-section of films with scanning electron microscope, approving chemical bonding between starch and matrix. The biodegradability was the most excellent with more than 10 wt. % of starch.

What we claim is:

1. A biodegradable polyethylene composition chemically bonded with starch comprising 100 parts by weight of polyethylene, 5–400 parts by weight of biodegradable incorporating material selected from the group consisting of corn starch, acid treated starch, esterified starch, etherified starch, cationic starch and mixtures thereof, 0.01–10 parts by weight of coupling agent selected from the group consisting of maleic anhydride, methacrylic anhydride and maleimide, 0.01–10 parts by weight of acid catalytic comonomer, 0.01–1.0 parts by weight of radical initiator, 0.01–10 parts by weight of autoxidizing agent and 0.01–10 parts by weight of plasticizer.

2. The composition in accordance with claim 1 wherein further comprising 0.01–10 parts by weight of a comonomer.

3. The composition in accordance with claim 2 wherein the comonomer is one or more selected from the group consisting of acrylonitrile, styrene and ethyl acrylate.

4. The composition in accordance with claim 1 wherein the polyethylene is selected from the group consisting of low density polyethylene, linear low density polyethylene or high density polyethylene.

5. The composition in accordance with claim 1 wherein the radical initiator is benzoyl peroxide, di-tert-butyl peroxide, azobisisobutyronitrile, tert-butyl hydroperoxide, dicumyl peroxide, 2,5-dimethyl-2,5-di(t-butylperoxy) hexane or 1,3-bis-(t-butylperoxyisopropyl benzene).

6. The composition in accordance with claim 1 wherein the autoxidizing agent is one or more selected from the group consisting of manganese oleate, manganese stearate, ferrous oleate(II), ferrous stearate(II) and mixtures thereof.

7. The composition in accordance with claim 1 wherein the plasticizer is one selected from group consisting of oleamide, poly(hexafluoropropylene)-co-poly(vinylidene fluoride) and cis-13-docosenoamide.

8. The composition in accordance with claim 1 wherein the acid catalytic comonomer acting as a catalyst as well as a compatibilizer at the same time is selected from the group consisting of acrylic acid and/or methacrylic acid.

9. A biodegradable polyethylene article chemically bonded with starch comprising mixing a polyethylene composition in accordance with claim 1, reactive-extruding the mixture and pelleting into master batch pellet.

10. A biodegradable polyethylene article in accordance with claim 9 which further comprises adding a polyethylene selected from the group consisting of low density polyethylene, linear low density polyethylene or high density polyethylene into the master batch pellet, dry-blending and extruding the above.

11. A biodegradable polyethylene article in accordance with claim 10 wherein the biodegradable polyethylene article is a film or a bottle.

12. A process for preparing a biodegradable polyethylene composition chemically bonded with starch, comprising mixing 100 parts by weight of polyethylene, 5–400 parts by weight of biodegradable incorporating material selected from the group consisting of corn starch, acid treated starch, esterified starch, etherified starch, cationic starch and mixtures thereof, 0.01–10 parts by weight of coupling agent selected from the group consisting of maleic anhydride, methacrylic anhydride and maleimide, 0.01–10 parts by weight of acid catalytic comonomer, 0.01–1.0 parts by weight of radical initiator, 0.01–10 parts by weight of autoxidizing agent and 0.01–10 parts by weight of plasticizer and reactive-extruding said mixture.

13. The process in accordance with claim 12 including further mixing one or more comonomers selected from the group consisting of acrylonitrile, styrene and ethyl acrylate in an amount of 0.01–10 parts by weight.

14. The process in accordance with claim 12 wherein further comprising drying the biodegradable incorporating material to a moisture content in the range of less than 3% before reactive-extruding the mixture.

15. The process in accordance with claim 12 wherein said mixture is reactive-extruded at a temperature of 150°–220° C. with a screw speed of 50–300 rpm.

* * * * *